(12) United States Patent
Williams

(10) Patent No.: US 7,203,911 B2
(45) Date of Patent: Apr. 10, 2007

(54) ALTERING A DISPLAY ON A VIEWING DEVICE BASED UPON A USER PROXIMITY TO THE VIEWING DEVICE

(75) Inventor: Lyndsay Williams, Giton (GB)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 10/145,483

(22) Filed: May 13, 2002

(65) Prior Publication Data

US 2003/0210258 A1    Nov. 13, 2003

(51) Int. Cl.
*G06F 3/00*    (2006.01)
*G06F 3/01*    (2006.01)

(52) U.S. Cl. .................................. 715/864; 345/158

(58) Field of Classification Search ................ 715/862, 715/773, 146, 863, 800, 700, 864; 382/254, 382/106; 600/437; 345/156, 419, 589, 158; 710/2; 351/239; 395/119
See application file for complete search history.

(56) References Cited

U.S. PATENT DOCUMENTS

| | | | | |
|---|---|---|---|---|
| 5,184,319 A * | 2/1993 | Kramer | ........................ | 703/5 |
| 5,337,353 A * | 8/1994 | Boie et al. | ............. | 379/433.01 |
| 5,367,315 A * | 11/1994 | Pan | ........................... | 345/156 |
| 5,367,614 A * | 11/1994 | Bisey | ......................... | 345/419 |
| 5,521,616 A * | 5/1996 | Capper et al. | .............. | 345/156 |
| 5,576,732 A * | 11/1996 | Minakuchi et al. | ........ | 345/667 |
| 5,598,523 A * | 1/1997 | Fujita | ........................ | 715/840 |
| 5,616,078 A * | 4/1997 | Oh | ............................... | 463/8 |
| 5,686,942 A * | 11/1997 | Ball | ............................ | 345/158 |
| 5,694,142 A * | 12/1997 | Dumoulin et al. | ............. | 345/9 |
| 5,742,264 A * | 4/1998 | Inagaki et al. | ................ | 345/8 |
| 5,786,804 A * | 7/1998 | Gordon | ..................... | 345/158 |
| 5,825,353 A * | 10/1998 | Will | ........................... | 345/184 |
| 5,900,863 A * | 5/1999 | Numazaki | ................... | 345/158 |
| 5,901,366 A * | 5/1999 | Nakano et al. | .......... | 455/550.1 |
| 5,913,727 A * | 6/1999 | Ahdoot | ........................ | 463/39 |
| 5,966,310 A * | 10/1999 | Maeda et al. | ............ | 707/104.1 |
| 5,973,608 A * | 10/1999 | McMahon | ................... | 341/33 |
| 5,982,352 A * | 11/1999 | Pryor | ......................... | 345/156 |
| 6,002,386 A * | 12/1999 | Gu | ............................. | 345/690 |
| 6,002,427 A * | 12/1999 | Kipust | ....................... | 348/156 |
| 6,031,519 A * | 2/2000 | O'Brien | ..................... | 345/156 |
| 6,064,354 A * | 5/2000 | DeLuca | ........................ | 345/7 |
| 6,084,556 A * | 7/2000 | Zwern | ........................ | 345/8 |
| 6,097,369 A * | 8/2000 | Wambach | ................... | 345/158 |
| 6,098,118 A * | 8/2000 | Ellenby et al. | ................ | 710/8 |
| 6,104,379 A * | 8/2000 | Petrich et al. | ............. | 345/157 |
| 6,115,025 A * | 9/2000 | Buxton et al. | ............. | 345/659 |
| 6,175,610 B1 * | 1/2001 | Peter | ............................. | 378/8 |
| 6,184,847 B1 * | 2/2001 | Fateh et al. | .................... | 345/8 |
| 6,215,471 B1 * | 4/2001 | DeLuca | ..................... | 345/158 |
| 6,243,075 B1 * | 6/2001 | Fishkin et al. | .............. | 345/156 |

(Continued)

*Primary Examiner*—Weilun Lo
*Assistant Examiner*—Steven Theriault
(74) *Attorney, Agent, or Firm*—Merchant & Gould P.C.

(57) ABSTRACT

A method, apparatus, and article of manufacture altering a displayed image presented to a user on a viewing device using the proximity of the user to the viewing device to determine how the displayed image is to be presented. The viewing device includes a plurality of proximity sensors that are used to determine the location of a user to the viewing device. As the user moves his or her position relative to the viewing device, the proximity sensors detect the change in the user position. These changes in detected position are used to alter the image being displayed upon the viewing device.

20 Claims, 8 Drawing Sheets

U.S. PATENT DOCUMENTS

| | | | |
|---|---|---|---|
| 6,281,878 B1 * | 8/2001 | Montellese | 345/156 |
| 6,283,860 B1 * | 9/2001 | Lyons et al. | 463/36 |
| 6,288,702 B1 * | 9/2001 | Tachibana et al. | 345/671 |
| 6,323,846 B1 * | 11/2001 | Westerman et al. | 345/173 |
| 6,330,676 B1 * | 12/2001 | Kelsey | 726/7 |
| 6,348,932 B1 * | 2/2002 | Nishikawa et al. | 715/719 |
| 6,408,187 B1 * | 6/2002 | Merriam | 455/458 |
| 6,424,410 B1 * | 7/2002 | Pelosi | 356/139.03 |
| 6,452,593 B1 * | 9/2002 | Challener | 345/419 |
| 6,487,421 B2 * | 11/2002 | Hess et al. | 455/550.1 |
| 6,498,860 B1 * | 12/2002 | Sasaki et al. | 382/103 |
| 6,504,526 B1 * | 1/2003 | Mauritz | 345/158 |
| 6,518,950 B1 * | 2/2003 | Dougherty et al. | 345/156 |
| 6,559,830 B1 * | 5/2003 | Hinckley et al. | 345/157 |
| 6,567,101 B1 * | 5/2003 | Thomas | 345/649 |
| 6,583,801 B2 * | 6/2003 | Eastty et al. | 715/863 |
| 6,583,813 B1 * | 6/2003 | Enright et al. | 348/150 |
| 6,592,223 B1 * | 7/2003 | Stern et al. | 351/239 |
| 6,597,374 B1 * | 7/2003 | Baker et al. | 715/717 |
| 6,603,491 B2 * | 8/2003 | Lemelson et al. | 715/784 |
| 6,634,816 B2 * | 10/2003 | Thomas | 400/472 |
| 6,646,685 B1 * | 11/2003 | Kim | 348/569 |
| 6,690,351 B1 * | 2/2004 | Wong | 345/156 |
| 6,720,949 B1 * | 4/2004 | Pryor et al. | 345/158 |
| 6,740,860 B2 * | 5/2004 | Kobayashi | 250/214.1 |
| 6,742,052 B2 * | 5/2004 | Himmel et al. | 710/2 |
| 6,804,415 B2 * | 10/2004 | Van Overveld et al. | 382/293 |
| 6,939,231 B2 * | 9/2005 | Mantyjarvi et al. | 463/30 |
| 6,971,072 B1 * | 11/2005 | Stein | 715/866 |
| 7,031,875 B2 * | 4/2006 | Ellenby et al. | 702/150 |
| 2001/0030668 A1 * | 10/2001 | Erten et al. | 345/863 |
| 2002/0092029 A1 * | 7/2002 | Smith | 725/105 |
| 2002/0167589 A1 * | 11/2002 | Schofield et al. | 348/148 |
| 2003/0001816 A1 * | 1/2003 | Badarneh | 345/156 |
| 2003/0093600 A1 * | 5/2003 | Perala et al. | 710/72 |
| 2003/0234799 A1 * | 12/2003 | Lee | 345/660 |

* cited by examiner

ALTERING A DISPLAY ON A VIEWING DEVICE BASED UPON A USER PROXIMITY TO THE VIEWING DEVICE

TECHNICAL FIELD

The invention relates generally to a controlling a display of an electronic image viewing device and more particularly to a system, method and article of manufacture for altering a display on a viewing device based upon a user proximity to the viewing device.

BACKGROUND

Computing systems typically possess input devices such as a mouse, trackball, or other pointing device to permit a user to provide input commands. These commands may include a set of commands to alter an image being viewed by the user upon a display device. Various mechanisms may be employed to define a command that alters the image being displayed.

Any of these mechanisms typically would instruct the computing system to scroll an image in either the vertical or horizontal direction or to zoom an image in and out. Typically, a separate mechanism is used to alter the scroll position of the image in each dimension. The zoom operation, that moves an image inward and outward as the image is enlarged and reduced, is similar to a scroll operation in a dimension perpendicular to the screen of the viewing device. These mechanisms typically require a user to manipulate a control object on the screen of the viewing device that is translated into a command to alter the image being displayed. These mechanisms also require a user to manipulate the pointing device to provide the commands needed to manipulate the screen control object.

For hand-held devices, the use of a separate pointing device requires a user to both hold the viewing device as well as manipulate the pointing device to provide the needed commands. Such an operation may prove to be difficult. In many cases, the image being displayed for viewing on the screen of the viewing device represents a small portion of a larger document, such as a portion of a large map being displayed. The user simply desires to navigate around the larger image, at various levels of zoom, to discover information of interest. Especially for a hand-held device, this operation is similar to moving a paper map around a center of a field of view relative to a user. At present, a computing device has not been instructed to manipulate an image being displayed to a user with the use of this simple and intuitive interface.

By determining the proximity of a user to viewing device, and by determining changes in the proximity information, the image being displayed to the user may be altered using the simple yet intuitive interface that is similar to the manner in which users interact with ordinary objects on a daily basis. By integrating such a feature into viewing devices, the user interface of the computing system may be improved. No such user interface has existed in computing systems to date. A system consistent with the invention disclosed herein addresses these deficiencies of prior computing systems.

SUMMARY

The present invention relates to a method, apparatus, and article of manufacture for altering a display on a viewing device based upon a user proximity to the viewing device. A system in accordance with the principles of the present invention includes a computing system for altering an image displayed to a user upon a viewing device based upon a measured proximity of the user to the viewing device. The computing system includes an image display module for presenting an image to the user, a plurality of proximity sensors where the proximity sensors being located upon opposite sides of the viewing device, and an image display processing system. The image display processing system includes a zoom command module for determining an amount of zoom to be applied to a displayed image based upon the measured proximity of the user to the viewing device, a scroll command module for determining an amount of scroll to be applied to a displayed image based upon the measured proximity of the user to the viewing device, and an image translation command processing module for applying the amount of zoom and the amount of scroll to the displayed image presented to the user on the viewing device.

Another aspect of the present invention is a computer implemented method of altering an image displayed to a user upon a viewing device having a plurality of proximity sensors based upon a measured proximity of the user to the viewing device. The method generates a zoom command based upon an average of the plurality of proximity time values, generates a scroll command based upon difference between the plurality of proximity time values, and alters the image displayed to the user based upon the zoom command and the scroll command.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION

Figure 1:
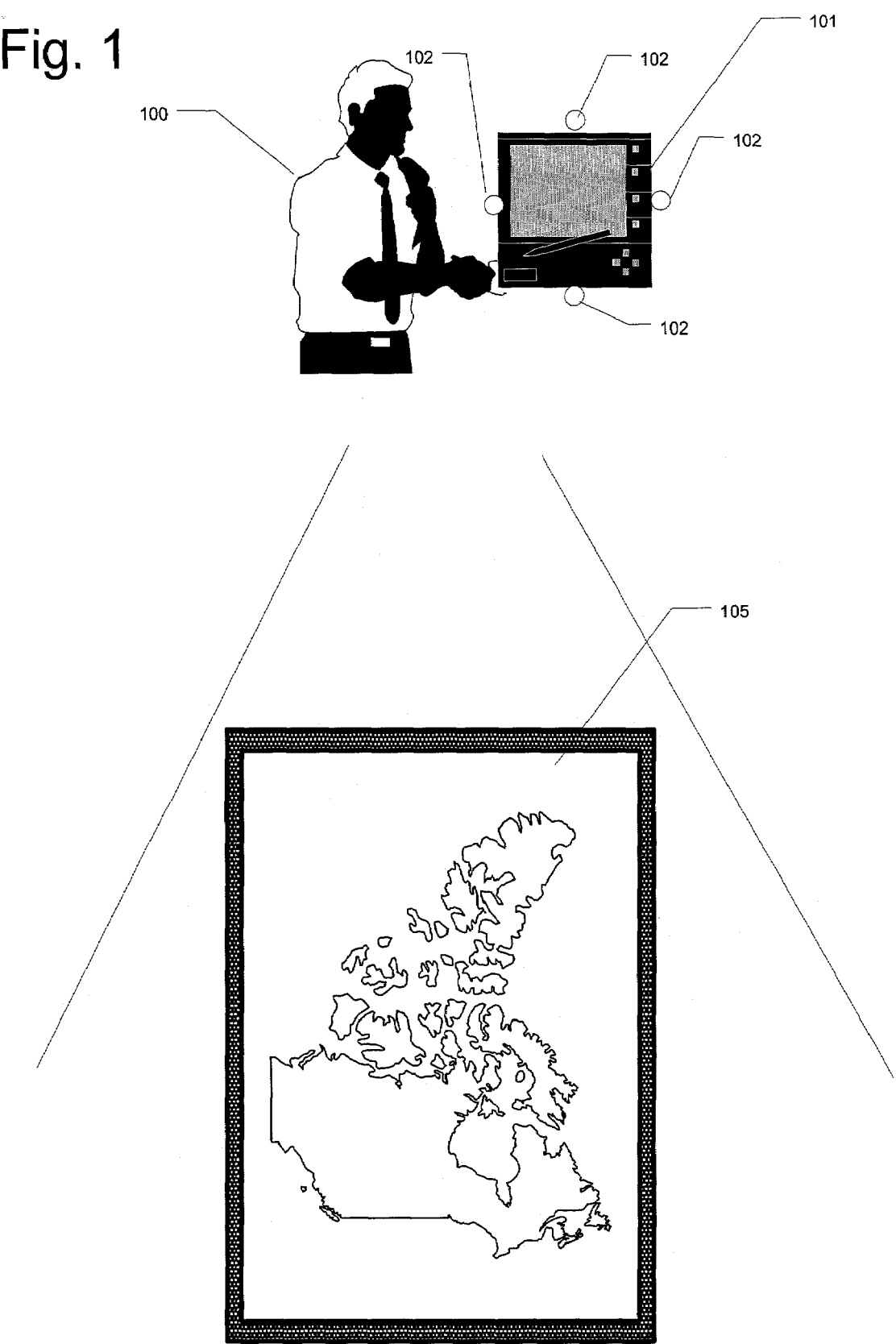
FIG. 1 illustrates a user of a hand-held computing device to alter an image displayed upon the hand-held computing device according to one embodiment of the present invention.

The present invention relates to a system, method and article of manufacture for altering a display on a viewing device based upon a user proximity to the viewing device. FIG. 1 illustrates a user of a hand-held computing device to alter an image displayed upon the hand-held computing device according to one embodiment of the present invention. A user 100 operates a hand-held computer 101 to display an image 105 on the screen of the hand-held device 101. In the example, the image 105 is a map that displays the entire land mass of Canada. The hand-held computer 101 also possesses a plurality of proximity sensors 102 to provide the computing system 101 with information regarding the position of the user relative to the viewing device 101 as well as any changes in the proximity of the user relative to the viewing device. As discussed herein, this information regarding the proximity of the user to the screen of the viewing device 101, and any changes observed thereto, may be used as commands to alter the image of the map of Canada.

The proximity sensors 102 may be constructed using infrared sensors such as a Sharp GP2D02 device. The proximity sensors 102 may also be constructed using an ultrasonic sensors such as a Devantech SFR04 device available from Robot Electronics Norfolk England. These devices provide a signal that corresponds to the distance from the sensor to an object in its field of view. If at least two such sensors 102 are mounted as part of the viewing device 101, proximity measurements may be obtained. In a preferred embodiment, the ultrasonic sensor is used as it provides a larger area for sensing the presence of a user. One skilled in the art will recognize that any such sensor may be used without deviating from the spirit and scope of the present invention as recited within the attached claims.

Figure 2:
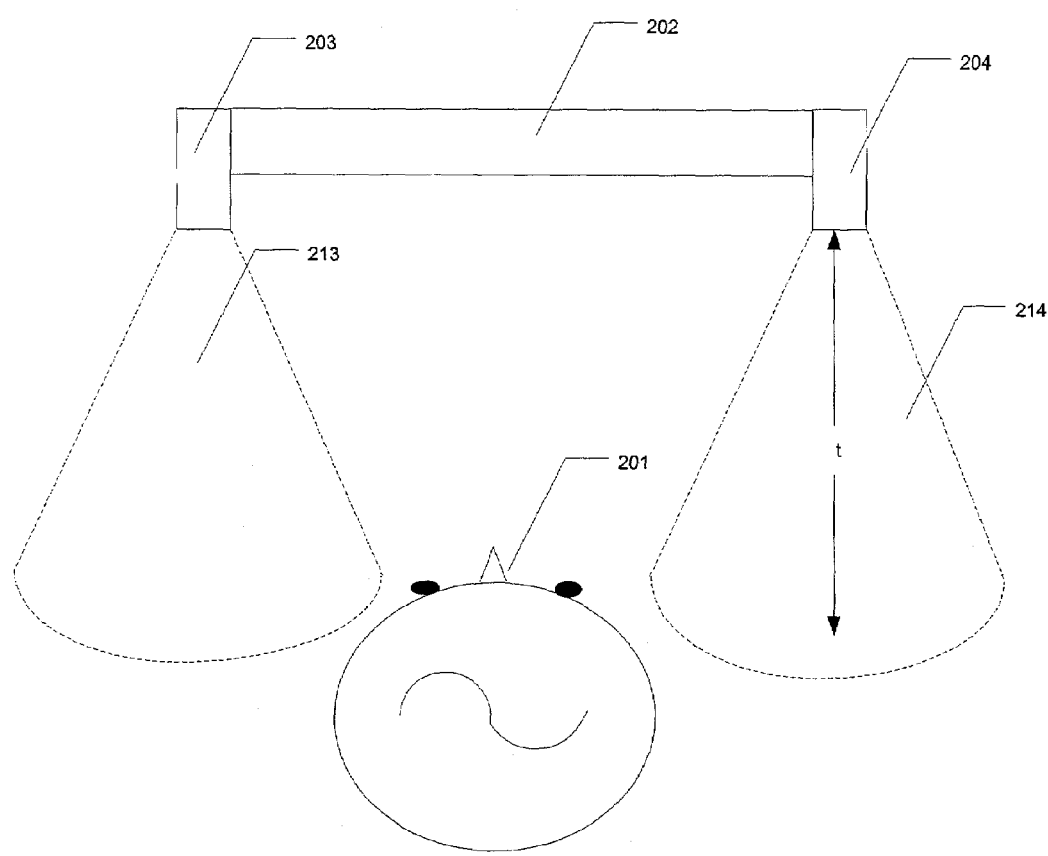
FIG. 2 illustrates a user of a desktop computing device to alter an image displayed upon the hand-held computing device according to another embodiment of the present invention.

FIG. 2 illustrates a user of a desktop computing device to alter an image displayed upon the hand-held computing device according to another embodiment of the present invention. In this second embodiment, the display device 202 consists of a display monitor 202 having a pair of proximity sensors 203–204 mounted on opposite sides of the monitor 202. A user 201 typically is positioned directly in front of the monitor 202 that is between a first proximity sensing area 213 generated by the first of the two proximity sensors 203 and a second proximity sensing area 214 generated by the second of the two proximity sensors 204. Each proximity sensor 203–204 determines the location of the user 201 by emitting a signal which is reflected off the user 201 causing a return signal to be received by the sensor. By determining the time between the generation of the transmitted signal and the receipt of the reflected signal for each of the proximity sensing regions 213–214, the proximity of the user 201 relative to the sensors 203–204, and thus the proximity of the user 201 to the monitor 202, may be determined.

Typically, each proximity sensing region 213–214 is sequentially tested for the presence of the user 201. This operation may be continuously being measured to provide an on-going set of information to the computing system, or may be provided only when a user instructs the computing system to obtain such information. A user 201 may intermittently instruct the computing system to use the proximity information to alter a image being displayed when a button is depressed, such as a mouse button or similar input device. Otherwise, the viewing device 202 may be continuously altering the image being displayed in response to near continuous movement of the user 201 in front of the monitor 202.

In an example embodiment, the proximity sensing region is periodically tested as determined by settings of 2 microswitches within the system. In addition, these measurements within the proximity sensing region are intended to be absolute measurements as compared to measurements of positions that indicate relative movements for cursor position.

In this example embodiment, the distance to screen (z) and pan (y) are measured and converted to z, y and z (wheel) signals as for a standard Microsoft mouse. These signals are connected to a communications port, such as an RS232 port, to control cursor position on screen. In addition, a standard mouse is used for fine cursor position as Windows XP allows two mice to control one cursor at the same time. A standard mouse is used to position cursor on a scroll bar and then the "ClickLock" in Control Panel-Mouse Settings is used to fix cursor on the scroll bar. An application such as "Windows Fax and Picture Viewer" may then used to zoom and pan around images in this way. Any application that uses a mouse can be controlled by SonarScreen, all the processing is now done in a microcontroller within the sensor and sent to a computing system, such as a personal computer. This device uses a process similar to how a standard peripheral devices such as a touchpad may interface to a computing system. In this example embodiment, samples are processed as follows:

Zoom=(left+right)/2: averaged for up to 8 samples

Pan=Constant−left−right: averaged for up to 32 samples

Standard Serial Mice report motion according to the following table:

|  | D6 | D5 | D4 | D3 | D2 | D1 | D0 |
|---|---|---|---|---|---|---|---|
| Byte 1 | 1 | LB | RB | Y7 | Y6 | X7 | X6 |
| Byte 2 | 0 | X5 | X4 | X3 | X2 | X1 | X0 |
| Byte 3 | 0 | Y5 | Y4 | Y3 | Y2 | Y1 | Y0 | where Symbol Definition:
LB State of the left button. depressed = 1, released 0
RB State of the right button. depressed = 1, released = 0

X7–X0: 8-bit signed 2's complement integer that presents the relative displacement of the device in the X direction since the last data transmission. A positive value indicates motion to the right, a negative value indicates motion to the left.

Y7–Y0: Same as X7–X0. A positive value indicates the device motion downwards, negative value indicates motion upwards. In addition, a wheel mouse provides z axis information which can be used for zoom control. A microswitch selects between zooming into screen, panning the screen, and both zooming and panning at the same time.

As mentioned above, Microsoft Windows XP allows two mice to control cursor movement simultaneously. The aim is to be able to read wide documents such as newspapers, maps, spreadsheets etc by using head movement to control zoom and pan of image size via the scroll bars, that may be locked mouse button via ClickLock found in a system Control Panel, in addition to fine control via the mouse. This absolute position measurement of left and right is translated to relative x control of cursor, and zoom data into a normal z axis, that was wheel control in wheel mouse. A mouse wheel can also be used conventionally to zoom in/out of images.

The sonar screen must be noise free increments to avoid cursor bounce, which is achieved by digital filtering as below. Absolute head position is translated into relative position for mouse cursor control. This digital filtering is currently done on the y axis of the cursor. All processing is done within a sonar screen peripheral device before data is communicated to a computing system such as a personal computer, so that the sonarscreen peripheral device may be used with any application that uses a mouse without special software being required on a computing system.

Figure 3A:
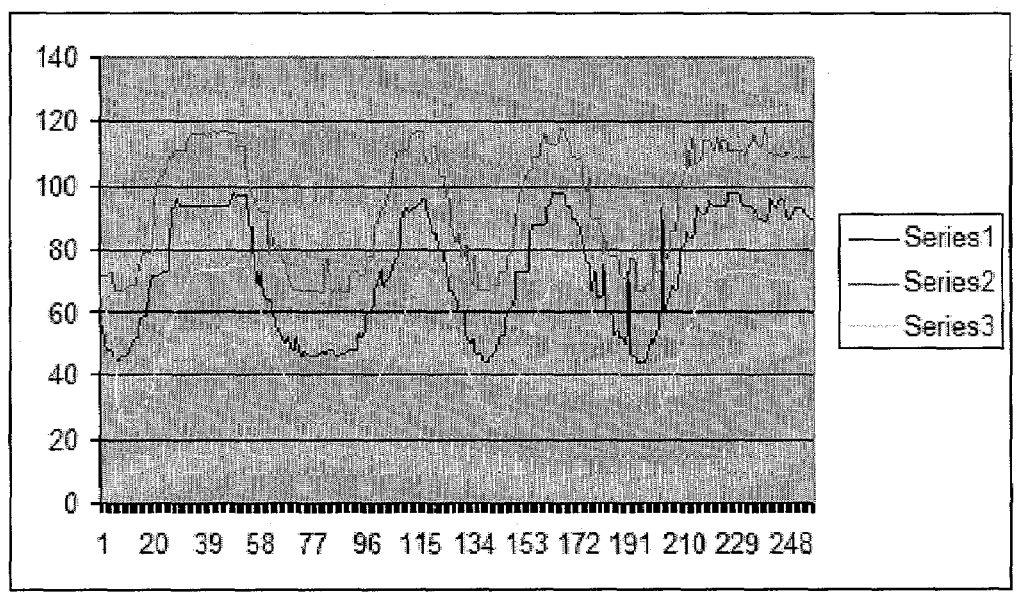
FIGS. 3a and 3b illustrate graphical representations of graphical representations of user head movement to cursor input movement according to various embodiments of the present invention.
Figure 3B:
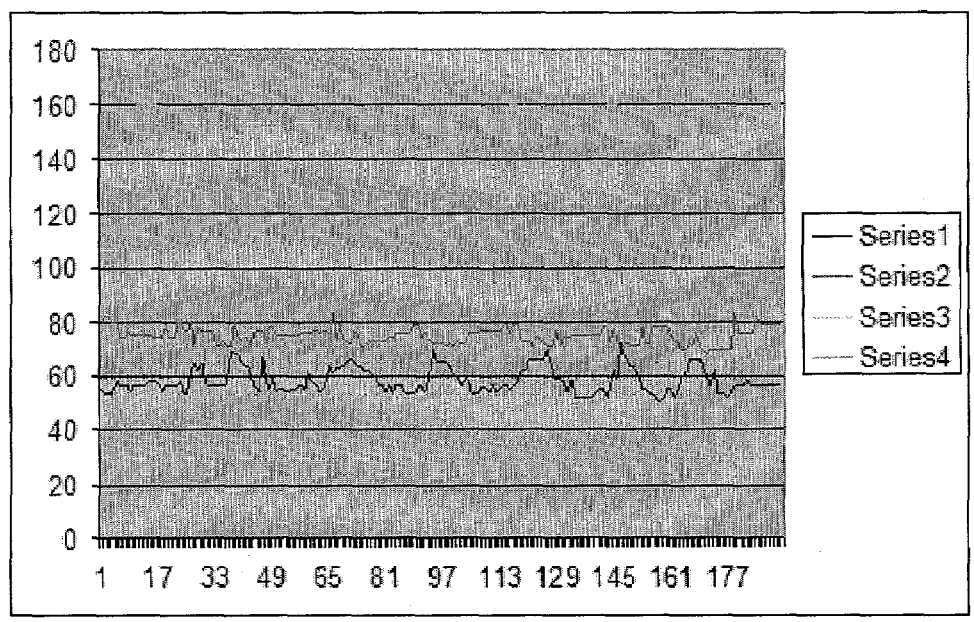

FIG. 3a illustrates head movement from 25 to 75 cm from laptop screen (zooming) as shown as a distanced measured by a pair of left and right ultrasonic receiver/transmitters. Series one illustrates raw left data for distance. Series two illustrates raw right data distance. Series three illustrates a value defined as (left+right)/2 then filtered with 8 stage averaging filter, unweighed. Flat section of series one trace is where a user's head has not moved. The example shown in FIG. 3a uses a 100 ms sample rate, x axis in time in 100 ms intervals, y axis is distance in cm (offset so traces are all visible). This can be faster down to limit of sound traveling 1 foot/ms. Similarly, FIG. 3b is example of head panning left to right, pink raw left, blue raw right, turquoise is (constant+ left−right) and then filtered with 16 stage averaging filter.

Figure 4:
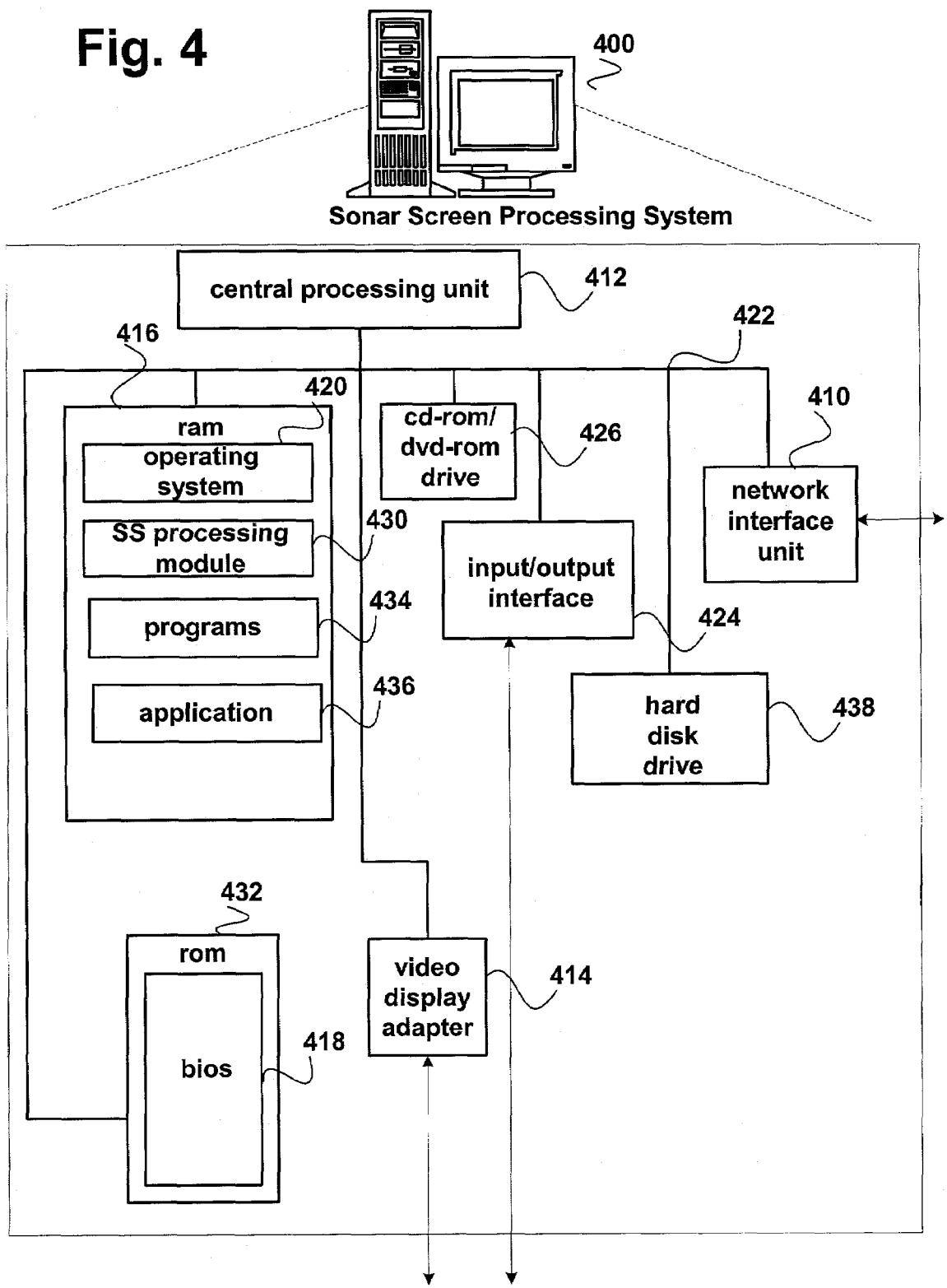
FIG. 4 illustrates an exemplary computing system useful for implementing an embodiment of the present invention.

FIG. 4 illustrates an exemplary computing system useful for implementing an embodiment of the present invention. An exemplary system 400 for implementing the invention includes a general-purpose computing device in the form of a conventional personal computer 400, including a processor unit 412, a system memory, and a system bus 422 that couples various system components including the system memory to the processor unit 412, The system bus 422 may be any of several types of bus structures including a memory bus or memory controller, a peripheral bus and a local bus using any of a variety of bus architectures. The system memory includes read only memory (ROM) 432 and random access memory (RAM) 416. A basic input/output system 418 (BIOS), which contains basic routines that help transfer information between elements within the personal computer 400, is stored in ROM 432.

The personal computer 400 further includes mass storage devices such as a hard disk drive 438 for reading from and writing to a hard disk, a magnetic disk drive for reading from or writing to a removable magnetic disk (not shown), and an optical disk drive 426 for reading from or writing to a removable optical disk such as a CD ROM, DVD, or other optical media. The hard disk drive 438, magnetic disk drive, and optical disk drive 426 are connected to the system bus 422 by a hard disk drive interface, a magnetic disk drive interface, and an optical drive interface, respectively. The drives and their associated computer-readable media provide nonvolatile storage of computer readable instructions, data structures, programs, and other data for the personal computer 400.

Although the exemplary environment described herein employs a hard disk, a removable magnetic disk, and a removable optical disk, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk, optical disk, ROM or RAM, including an operating system 420, one or more application programs 436, other program modules 430, 434, and program data. A user may enter commands and information into the personal computer 400 through input devices such as a keyboard and mouse or other pointing device such as a pen-based computer screen. Examples of other input devices may include a microphone, joystick, game pad, satellite dish, and scanner. These and other input devices are often connected to the processing unit 412 through a serial port interface 424 that is coupled to the system bus 422. Nevertheless, these input devices also may be connected by other interfaces, such as a parallel port, game port, or a universal serial bus (USB). A monitor or other type of display device is also connected to the system bus 422 via an interface, such as a video adapter 414. In addition to the monitor, personal computers typically include other peripheral output devices (not shown), such as speakers and printers.

The personal computer 400 may operate in a networked environment using logical connections to one or more remote computers, such as a remote computer. The remote computer may be another personal computer, a server, a router, a network PC, a peer device or other common network node, and typically includes many or all of the elements described above relative to the personal computer. The network connections include a local area network (LAN) and a wide area network (WAN). Such networking environments are commonplace in offices, enterprise-wide computer networks, intranets, and the Internet.

When used in a LAN networking environment, the personal computer 400 is connected to the local network through a network interface or adapter 410. When used in a WAN networking environment, the personal computer 400 typically includes a modem or other means for establishing communications over the wide area network, such as the Internet. The modem, which may be internal or external, is connected to the system bus 422 via the serial port interface 424. In a networked environment, program modules depicted relative to the personal computer 400, or portions thereof, may be stored in the remote memory storage device. It will be appreciated that the network connections shown are exemplary, and other means of establishing a communications link between the computers may be used.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 5:
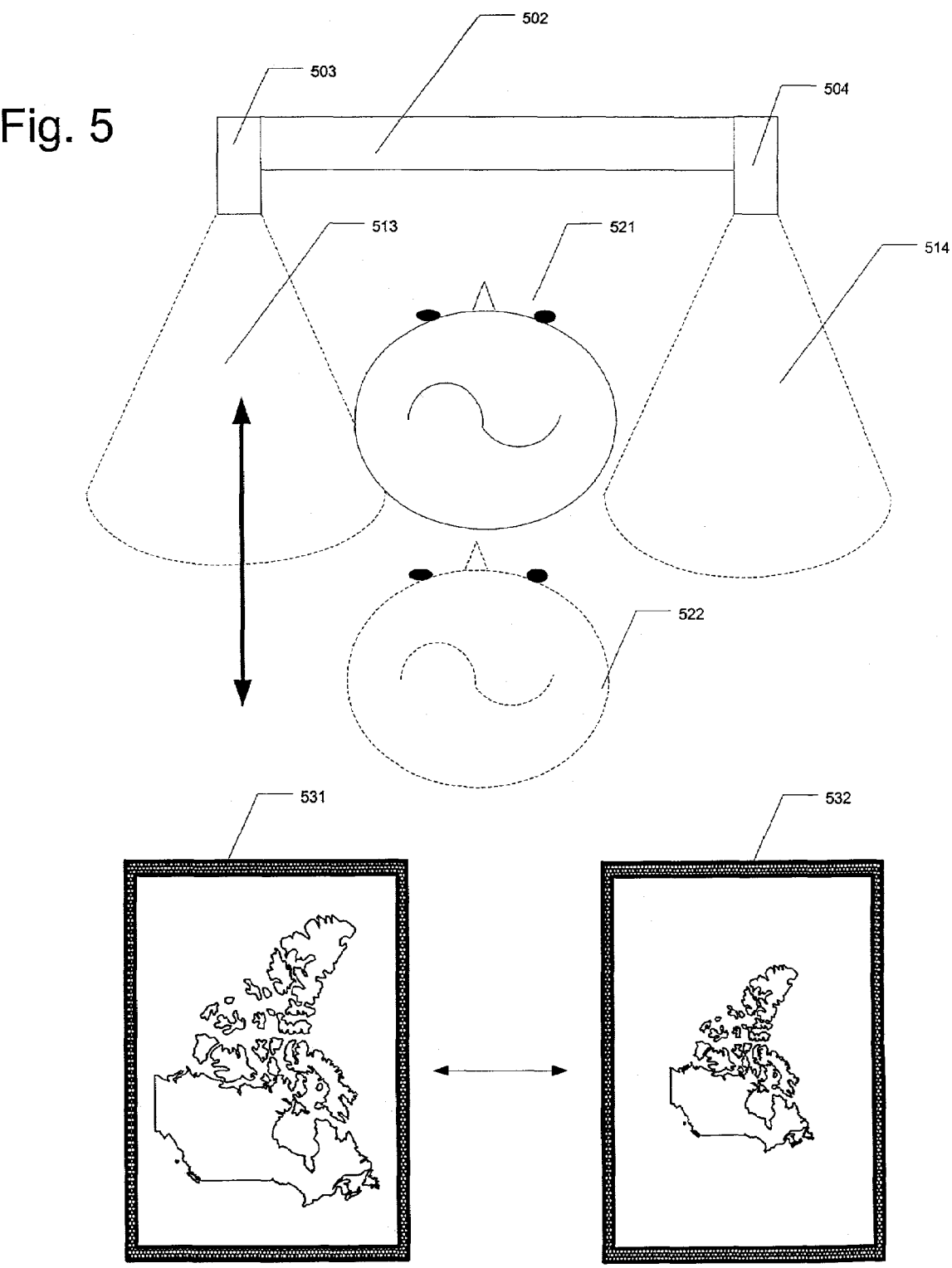
FIG. 5 illustrates altering an image by zooming the content of the display in response to movement of a user of the viewing device according to an embodiment of the present invention.

FIG. 5 illustrates altering an image by zooming the content of the display in response to movement of a user of the viewing device according to an embodiment of the present invention. Consider a viewing device 502 similar to the system disclosed in FIG. 2 having a pair of proximity sensors 503–504 with corresponding proximity sensing regions 513–414. When instructed to obtain proximity information, each of the sensors 503–504 sequentially generate a signal that is reflected off of the user and a return signal is measured. The time for this reflected signal to be obtained from the transmission of the generated signal is measured for each proximity sensing region 513–514.

When the user is located at a first position 521 that is close to the monitor 502, the measured time will be short. When the user is located at a second position 522 that is farther away from the monitor 502, the measured time will be longer. While the absolute distance may not be important, the difference in the proximity between the first position 521 and the second position 522 may be used to alter a displayed image. In a case in which the change in zoom is being tested, the change in the average time for both sensing regions 513–514 is determined. This average change is used to instruct the computing system to alter the displayed image.

Now consider the viewing device 502 again is displaying a map of the land mass of Canada. When the user is located at the first position 521, a first image of the map 531 is displayed upon the viewing device 502. When the user moves to the second position 522, a second image of the map 532 is displayed upon the viewing device 502. The change in the proximity of the user to the viewing device is detected as a lengthening in the measured time for the reflected signal to be received. This change is detected as a command to alter the displayed image and the image is zoomed outward as if the user moved the map farther away.

While this example embodiment is described using a desktop monitor, one skilled in the art will recognize that a hand-held computer having proximity sensors integrated into the device will operate in a similar manner as the distance between the user and the device is altered. In addition, the amount the image is zoomed for any give amount of change in the proximity of the user may be controlled as a simple scaling factor that is set in any number of ways as discussed above with respect to use of a control panel and corresponding mouse and pointing device options.

Figure 6:
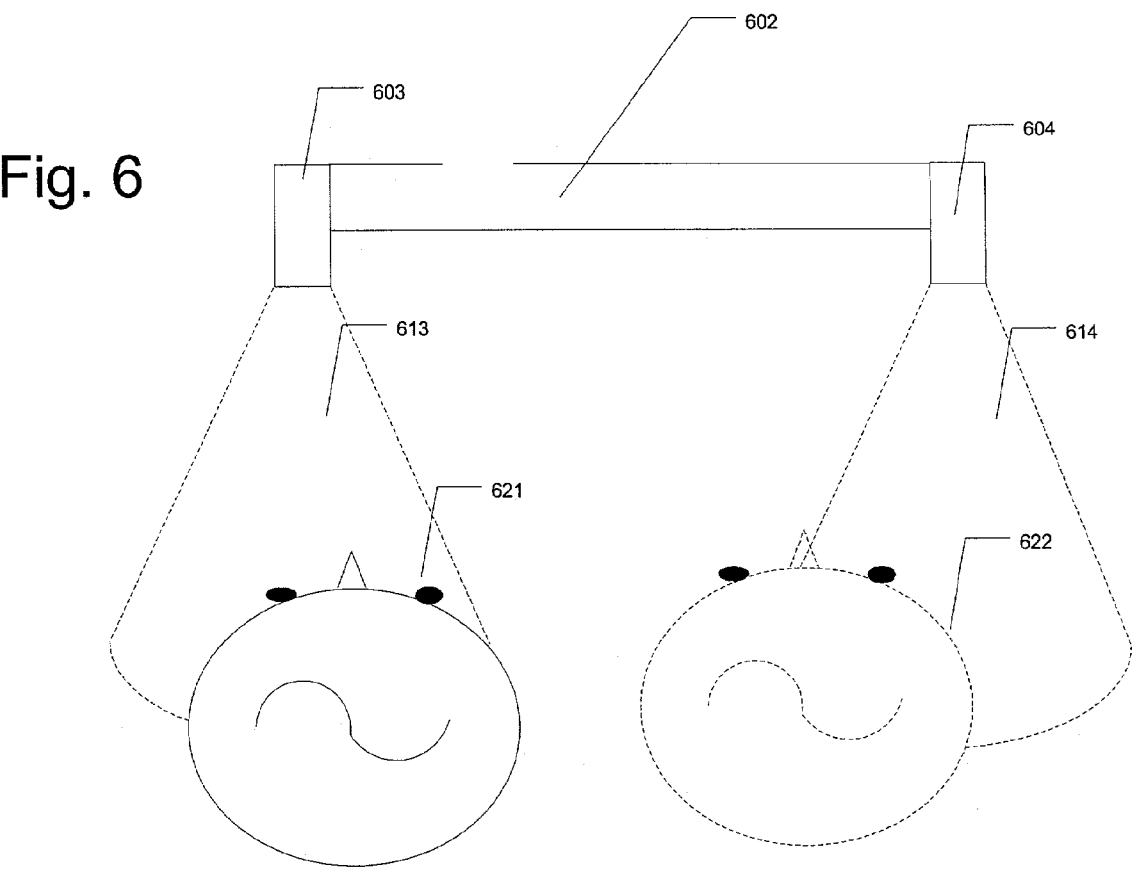
FIG. 6 illustrates altering an image by scrolling the content of the display in response to movement of a user of the viewing device according to an embodiment of the present invention.
Figure 6:
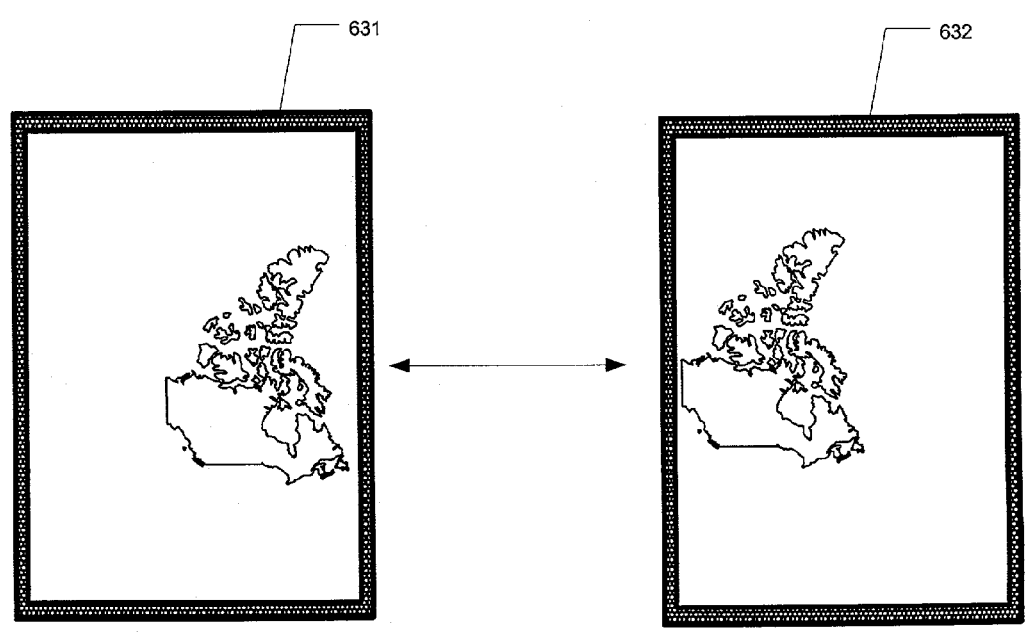

FIG. 6 illustrates altering an image by scrolling the content of the display in response to movement of a user of the viewing device according to an embodiment of the present invention. Once again, consider a viewing device 602 similar to the system disclosed in FIG. 2 having a pair of proximity sensors 603–604 with corresponding proximity sensing regions 613–614. When instructed to obtain proximity information, each of the sensors 603–604 sequentially generate a signal which is reflected off of the user and a return signal is measured. The time for this reflected signal to be obtained from the transmission of the generated signal is measured for each proximity sensing region 613–614. In a case in which the change in scroll is being determined, the change in the difference in time for both sensing regions 613–614 is determined. This change in the difference between the measured time is used to instruct the computing system to alter the displayed image.

When the user is located at a first position 621 that is close to the monitor 602, the measured time will be shorter for the first sensor 603 and longer for the second sensor 604. When the user is located at a second position 622 that is farther away from the monitor 602, the measured time will be longer for the first sensor 603 and shorter for the second sensor 604. The difference between the time measured in the first sensing region 613 and the second sensing region 614 will indicate the relative proximity of the user to the two sensors, and thus the proximity relative to the monitor 602. While the absolute distance may not be important, the difference in the proximity between the first position 621 and the second position 622 may again be used to alter a displayed image.

Once again, consider the viewing device 602 again is displaying a map of the land mass of Canada. When the user is located at the first position 621, a first image of the map 631 is displayed upon the viewing device 602. When the user moves to the second position 622, a second image of the map 632 is displayed upon the viewing device 602. The change in the proximity of the user to the viewing device is detected as a change in the difference in the measured time for each of the reflected signal to be received. This change is detected as a command to alter the displayed image and the image is scrolled as if the user moved the map from side to side.

While this example embodiment is described using a desktop monitor, one skilled in the art will again recognize that a hand-held computer having proximity sensors integrated into the device will operate in a similar manner as the distance between the user and the device is altered. In addition, the amount the image is scrolled for any give amount of change in the proximity of the user may be controlled as a simple scaling factor that is set in any number of ways.

Figure 7:
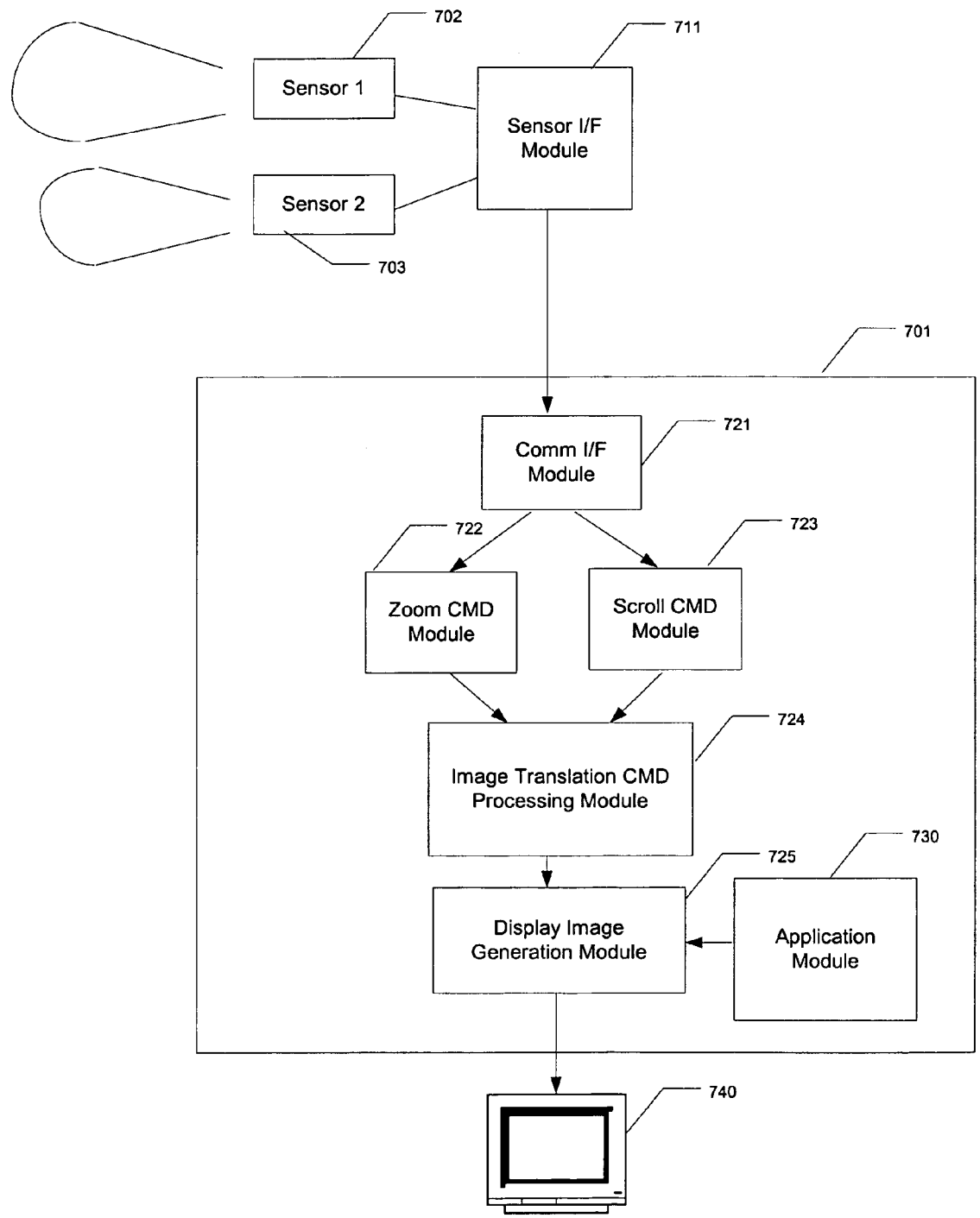
FIG. 7 illustrates a block diagram for an image manipulation and display processing system according to an embodiment of the present invention.

FIG. 7 illustrates a block diagram for an image manipulation and display processing system according to an embodiment of the present invention. The system includes a plurality of proximity sensors 702–703, a sensor interface and control module 711, a viewing device processing system 701, and a display device 740. As discussed above, the sensors 702–703 are mounted to be part of the display device 740 to detect the proximity of a user to the display device 740.

The sensor interface module 711 electrically connects the sensors to the processing system 701. The sensor interface module 711 also controls the operation of the sensors to control the sequential timing for the generation of the signals used to obtain the proximity data. The sensor interface module 711 transits each of the measured proximity time data values to the processing system 701 for subsequent processing. In a preferred embodiment, this data is communicated using a serial connection to the computing device to a communications interface module 721. In the case of a hand-held computing system in which the sensors 702–703 are integrated within the device, this connection may be any interface mechanism within the processing system to communicate the data to other processing modules within the system.

The display device 740 displays an output image generated by the processing system 701. Typically, this image is generated by an application module 730 that stored its data within a image display buffer. The processing system 701 typically includes a display image generation module 725 that takes the contents of the image display buffer and outputs the image to the display device 740. This displayed image may, therefore, be altered either by instructing the application module 730 to change the content of the image display buffer, or to instruct the display image generation module 725 to change the image being displayed using the contents of the image display buffer. One skilled in the art will recognize that the image displayed upon a viewing device may be generated in a number of ways as discussed above without deviating from the spirit and scope of the present invention as recited within the attached claims.

During operation, the communication interface module 721 receives the individual proximity sensor time measurements from the sensor interface module 711. Once received, these individual proximity sensor time measurements are passed to a zoom command module 722 and a scroll command module 723. The zoom command module 722 determines the average time for the individual proximity sensor time measurements and then determines the change in the average proximity sensor time measurement since the last value was determined. This change in the observed average time is used to control alterations in the zoom of the displayed image. Similarly, the scroll command module 723 determines the difference in the measured time for each pair of individual proximity sensor time measurements and then determines the change in the difference in the proximity sensor time measurement since the last value was determined. The change in the observed difference in the measured time is used to control alterations in the scroll of the displayed image.

The zoom command module 722 passes its calculated data values to an image translation command processing module 724 to determine the amount, if any, the displayed image is to be zoomed. Similarly, the scroll command module 723 passes its calculated data values to an image translation command processing module 724 to determine the amount and direction, if any, the displayed image is to be scrolled. This command processing module 724 instructs the display image generation module 725 and the application module 725 if the image being displayed is to be altered, and if so, by how much. A minimum amount of change, or hysteresis system may need to be detected before an image is altered as a means to eliminate jitter, false triggering, and similar effects. This processing continues continuously of the sensors 702–703 are always generating data, or intermittently when commanded by a user.

Figure 8:
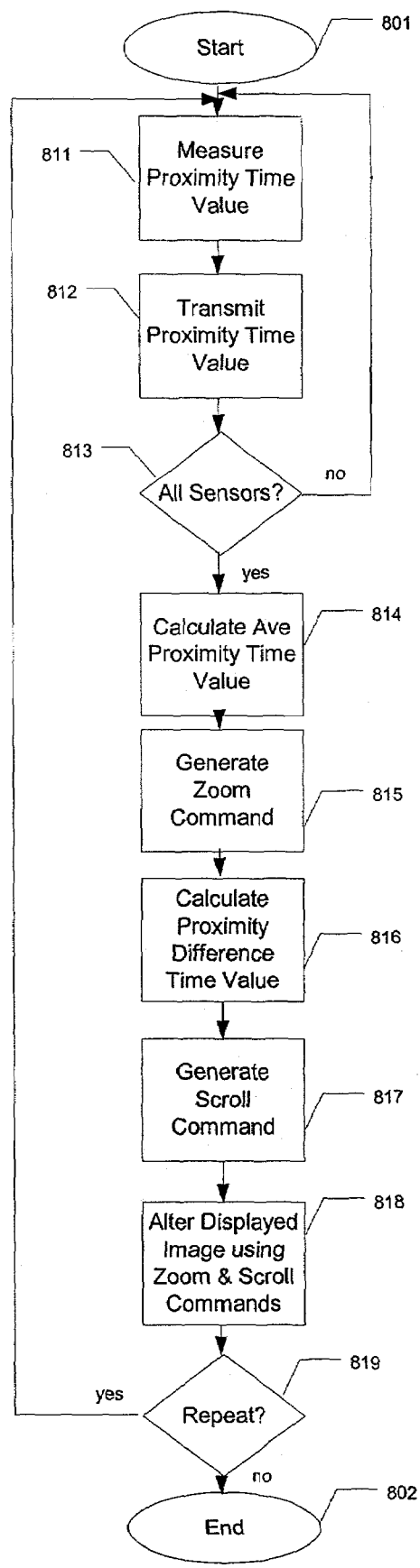
FIG. 8 illustrates an operational flow for an image manipulation and display processing system according to yet another example embodiment of the present invention.

FIG. 8 illustrates an operational flow for an image manipulation and display processing system according to yet another example embodiment of the present invention. The processing begins 801 and immediately a proximity time data value is measured in module 811 for a first proximity sensor. Once the value is obtained, the data value is transmitted from the sensor modules to the processing modules in module 812 for later use.

Test module 813 determines if additional sensor modules are to be processed. If so, test module 813 returns the processing to module 811 to control the operation of the next sensor to obtain the addition data. If test module 813 determines that no additional sensors are to be processed, the processing continues to module 814.

In module 814, the previously received proximity time data values are averaged to determine a measure of how close a user is to the sensors, and thus how close the user is to the display device. Using this average value, a zoom command is generated in module 815. The zoom command module 815 uses the newly determined value with one or more previous values to determine whether the user has moved relative to the display, and if so, by how much.

Next, the recently obtained proximity time values are used to determine pairs of time difference values to determine the X-Y position of the user relative to the display device in module 816. These pairs of difference values are then used in module 817 to generate a scroll command. Once again the Scroll command module 817 may use the newly determined values with one or more previously generated values to determine if the user has moved in an X-Y direction, and if so by how much.

The zoom command generated by the zoom command module 815 and the scroll command generated by the scroll command module 817 are then used in an alter displayed image module 818 to modify the image presented to a user in response to the movement of the user relative to the display device. Test module 819 determines if the image alteration process is to repeat. If so, the processing returns to module 811 to update the displayed image based upon a new measured proximity of a user. If test module 819 determines that no additional alterations to the displayed image are to occur, the processing ends 802.

FIG. 4 illustrates an example of a suitable operating environment 400 in which the invention may be implemented. The operating environment is only one example of a suitable operating environment 400 and is not intended to suggest any limitation as to the scope of use or functionality of the invention. Other well known computing systems, environments, and/or configurations that may be suitable for use with the invention include, but are not limited to, personal computers, server computers, held-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed in desired in various embodiments.

A computing system 400 typically includes at least some form of computer readable media. Computer readable media can be any available media that can be accessed by the system 400. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, BEPROM, flash memory or other memory technology, BC-ROM, digital versatile disks (DVD) or other optical storage, magnetic cassettes, magnetic tape, magnetic disk storage or other magnetic storage devices, or any other medium which can be used to store the desired information and which can be accessed by the computer 400.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

While the above embodiments of the present invention describe a processing system for altering an image displayed to a user, one skilled in the art will recognize that the various computing architectures may be used to implement the present invention as recited within the attached claims. It is to be understood that other embodiments may be utilized and operational changes may be made without departing from the scope of the present invention.

The foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. Thus the present invention is presently embodied as a method, apparatus, computer storage medium or propagated signal containing a computer program for providing a method, apparatus, and article of manufacture for altering an image displayed to a user based upon the proximity of the user to the display device.

What is claimed is:

1. A computer implemented method of altering an image displayed to a user upon a viewing device having a plurality of proximity sensors based upon a measured proximity of the user to the viewing device, the method comprising:
    sending signals generated by the proximity sensors;
    receiving the signals reflected off of the user using the proximity sensors;
    determining a plurality of proximity time values for each of the plurality of proximity sensors;
    generating a zoom command by averaging a sum of up to eight of the plurality of proximity time values from sensors of the plurality of proximity sensors located on opposite sides of the viewing device;
    generating a scroll command by averaging a difference between up to thirty-two of the plurality of proximity time values from the sensors located on opposite sides of the viewing device; and
    altering the image displayed to the user based upon the zoom command and the scroll command.

2. The method according to claim 1, wherein the method further comprises:
    receiving an input signal from the user; and
    continuously obtaining proximity time values and altering the image displayed to the user when the input signal is received from the user.

3. The method according to claim 1, wherein the proximity sensors are ultrasonic sensors.

4. The method according to claim 1, wherein the proximity sensors are infrared sensors.

5. The method according to claim 2, wherein the input signal is generated by the user depressing a button upon the viewing device.

6. The method according to claim 2, wherein the proximity sensors comprise a pair of sensors located on a left and a right side of the viewing device.

7. The method according to claim 2, wherein the proximity sensors comprise at least two pairs of sensors with a least one sensor being located about each side of the viewing device.

8. A computer program data product including a computer storage media readable by a computing system and encoded with instructions to implement a method of altering an image displayed to a user upon a viewing device having a plurality of proximity sensors, the method comprising:
    sending signals generated by the proximity sensors;
    receiving the signals reflected off of the user using the proximity sensors;
    determining a plurality of proximity time values for each of the plurality of proximity sensors;
    generating a zoom command by averaging a sum of up to eight of the plurality of proximity time values from sensors of the plurality of proximity sensors located on opposite sides of the viewing device;
    generating a scroll command by averaging a difference between up to thirty-two of the plurality of proximity time values from the sensors located on opposite sides of the viewing device; and
    altering the image displayed to the user based upon the zoom command and the scroll command.

9. The computer program data product according to claim 8, wherein the method further comprises:
    receiving an input signal from the user; and
    continuously obtaining proximity time values and altering the image displayed to the user when the input signal is received from the user.

10. The computer program data product according to claim 8, wherein the proximity sensors are ultrasonic sensors.

11. The computer program data product according to claim 8, wherein the proximity sensors are infrared sensors.

12. The computer program data product according to claim 9, wherein the input signal is generated by the user depressing a button upon the viewing device.

13. The computer program data product according to claim 9, wherein the proximity sensors comprise a pair of sensors located on a left and a right side of the viewing device.

14. The computer program data product according to claim 9, wherein the proximity sensors comprise at least two pairs of sensors with a least one sensor being located about each side of the viewing device.

15. A computing system for altering an image displayed to a user upon a viewing device based upon a measured proximity of the user to the viewing device, the computing system comprising:
    an image display module for presenting an image to the user;
    a plurality of proximity sensors, the proximity sensors being located upon opposite sides of the viewing device, and the proximity sensors being configured to send signals and receive the signals reflected off of the user; and
    an image display processing system, wherein the image display processing system comprises:
        a zoom command module for determining an amount of zoom to be applied to a displayed image by averaging a sum of up to eight of the plurality of proximity time values from the sensors located on opposite sides of the viewing device;
        a scroll command module for determining an amount of scroll to be applied to a displayed image by averaging a difference between up to thirty-two of the plurality of proximity time values from the sensors located on opposite sides of the viewing device; and
        an image translation command processing module for applying the amount of zoom and the amount of scroll to the displayed image presented to the user on the viewing device.

16. The computing system according to claim 15, wherein the proximity sensors are infrared sensors.

17. The computing system according to claim 15, wherein the proximity sensors are ultrasonic sensors.

18. The computing system according to claim 15, wherein the zoom command module determines the amount of zoom using an average measured time value for all of the plurality of proximity sensors.

19. The computing system according to claim 15, wherein the scroll command module determines the amount of scroll using a difference in the measured time value for all pairs of the plurality of proximity sensors.

20. The computing system according to claim 15, wherein the viewing device comprises a hand held computing system.

* * * * *